(12) United States Patent
Hirase et al.

(10) Patent No.: US 12,552,275 B2
(45) Date of Patent: Feb. 17, 2026

(54) WORK VEHICLE

(71) Applicant: KUBOTA CORPORATION, Osaka (JP)

(72) Inventors: Yuji Hirase, Osaka (JP); Sumio Yagyu, Osaka (JP); Kazuto Okazaki, Osaka (JP); Tsunehiro Ii, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 343 days.

(21) Appl. No.: 18/133,713

(22) Filed: Apr. 12, 2023

(65) Prior Publication Data
US 2023/0391212 A1    Dec. 7, 2023

(30) Foreign Application Priority Data
Jun. 3, 2022 (JP) ................. 2022-090761

(51) Int. Cl.
| | | |
|---|---|---|
| *B60L 50/60* | (2019.01) | |
| *B60K 11/04* | (2006.01) | |
| *B60L 50/13* | (2019.01) | |
| *B60L 50/61* | (2019.01) | |
| *B60L 53/22* | (2019.01) | |

(52) U.S. Cl.
CPC .............. *B60L 53/22* (2019.02); *B60K 11/04* (2013.01); *B60L 50/13* (2019.02); *B60L 50/61* (2019.02); *B60L 50/66* (2019.02); *B60L 2200/40* (2013.01); *B60L 2210/30* (2013.01); *B60L 2210/40* (2013.01)

(58) Field of Classification Search
CPC ........ B60L 53/22; B60L 50/161; B60L 50/66; B60L 50/13; B60L 2200/40; B60L 2210/30; B60K 11/04

USPC ........................................................ 180/65.22
See application file for complete search history.

(56) References Cited

U.S. PATENT DOCUMENTS 8,798,875 B2 *  8/2014 Yanagisawa .......... B60W 10/08
                                                    701/50
9,790,662 B2 * 10/2017 Ota ........................ B60K 6/485
(Continued)

FOREIGN PATENT DOCUMENTS

| JP | 2005-138792 A | 6/2005 |
|---|---|---|
| JP | 2011-121429 A | 6/2011 |

(Continued)

OTHER PUBLICATIONS

European Search Report issued Oct. 31, 2023 in European family member application No. 23168020.8.
(Continued)

*Primary Examiner* — Hau V Phan
(74) *Attorney, Agent, or Firm* — Greenblum & Bernstein, P.L.C.

(57) ABSTRACT

A work vehicle including: a front wheel; a rear travel device; a travel body supported by the front wheel and the rear travel device; a driving section provided in the travel body and having an occupant floor section; a transmission configured to output power to the rear travel device; a transmission case housing the transmission; an electric motor coupled to the transmission; and an inverter connected to the electric motor, wherein: the inverter is provided between the front wheel and the rear travel device, under the floor section, and laterally of the transmission case.

20 Claims, 5 Drawing Sheets

(56) References Cited

U.S. PATENT DOCUMENTS

| | | | |
|---|---|---|---|
| 10,060,096 B2* | 8/2018 | Takeo | E02F 3/32 |
| 10,232,699 B2* | 3/2019 | Oyama | B60K 6/26 |
| 10,343,513 B2* | 7/2019 | Oyama | B60K 5/12 |
| 10,538,157 B2* | 1/2020 | Oyama | B60K 17/354 |
| 11,059,367 B2* | 7/2021 | Oyama | B60K 5/12 |
| 11,198,395 B2* | 12/2021 | Smith | B60R 3/02 |
| 11,434,981 B2* | 9/2022 | Oyama | F16H 57/0416 |
| 2013/0168166 A1 | 7/2013 | Konz et al. | |
| 2015/0303660 A1 | 10/2015 | Sakamoto | |
| 2016/0017570 A1* | 1/2016 | Miyamoto | B60W 10/10 180/53.4 |
| 2016/0144860 A1* | 5/2016 | Naito | F16H 61/16 192/3.51 |
| 2017/0174069 A1 | 6/2017 | Oyama et al. | |
| 2022/0111721 A1* | 4/2022 | Ore | B60K 6/365 |
| 2022/0128023 A1* | 4/2022 | Fliearman | B60K 17/06 |

FOREIGN PATENT DOCUMENTS

| | | |
|---|---|---|
| JP | 2013-216216 A | 10/2013 |
| JP | 2014-65349 A | 4/2014 |
| JP | 2014-189184 A | 10/2014 |
| JP | 2015-39919 A | 3/2015 |
| JP | 2015-205596 A | 11/2015 |

OTHER PUBLICATIONS

Japanese Office Action issued May 20, 2025 in Japanese Priority Application No. 2022-090761 (Machine Translation).

* cited by examiner

WORK VEHICLE

BACKGROUND OF THE INVENTION

1. Field of the Invention

The present invention relates to work vehicles provided with a travel body supported by front wheels and a rear travel device.

2. Description of the Related Art

Such work vehicles include those provided with a transmission (continuously variable transmission, forward-reverse switching device, gear transmission) that outputs power to the rear travel device (rear wheels), and an electric motor (motor generator) coupled to the transmission, as shown in the JP 2014-65349A.

SUMMARY OF THE INVENTION

A work vehicle according to the present invention comprising:
- a front wheel;
- a rear travel device;
- a travel body supported by the front wheel and the rear travel device;
- a driving section provided in the travel body and having an occupant floor section;
- a transmission configured to output power to the rear travel device;
- a transmission case housing the transmission;
- an electric motor coupled to the transmission; and
- an inverter connected to the electric motor, wherein:
- the inverter is provided between the front wheel and the rear travel device, under the floor section, and laterally of the transmission case.

According to this configuration, maintenance of the inverter can be performed via the region between the front wheel and the rear travel device from laterally outward of the vehicle body, and thus the inverter can be provided in a manner that facilitates maintenance.

Another work vehicle according to the present invention comprising:
- a front wheel;
- a rear travel device;
- a travel body supported by the front wheel and the rear travel device;
- a driving section provided in the travel body and having an occupant floor section;
- a hybrid transmission having an engine and a motor generator, and configured to shift drive power of the engine and output resultant drive power to the rear travel device;
- a transmission case housing the hybrid transmission;
- an exhaust gas treatment device configured to purify an exhaust of the engine;
- a reducing agent tank configured to store a reducing agent to be supplied to the exhaust gas treatment device; and
- an inverter connected to the motor generator, wherein:
- the inverter is provided between the front wheel and the rear travel device, under the floor section, and on a first side in a width direction of a vehicle body of the work vehicle relative to the transmission case, and
- the reducing agent tank is provided between the front wheel and the rear travel device, under the floor section, and on a second side in the width direction of the vehicle body relative to the transmission case.

According to this configuration, maintenance on the inverter can be performed via the region between the front wheel and the rear travel device from laterally outward of the vehicle body on one side in the width direction of the vehicle body. The weight of the inverter and the weight of the reducing agent stored in the reducing agent tank are imposed on the vehicle body so as to be distributed laterally between both sides of the vehicle body relative to the transmission case, and thus the inverter can be provided in a manner that facilitates maintenance while readily balancing the weight of the left and right sides of the vehicle body.

In the present invention, it is preferable that the work vehicle further includes a running board provided laterally outward of the driving section, and the inverter is provided inward of the running board in the width direction of the vehicle body.

According to this configuration, the running board can be utilized as a guard member for the inverter, and thus the inverter can be protected at low cost without requiring a special guard member. Also, even if a guard member is added, the guard member need only be small and the inverter can be protected at low cost.

In the present invention, it is preferable that the work vehicle further includes a cooling device aligned with the inverter in a vertical direction of the vehicle body and configured to cool the inverter.

According to this configuration, the cooling device is located near the inverter, and thus maintenance of the cooling device is easily performed together with maintenance of the inverter.

In the present invention, it is preferable that the cooling device is located downward of the inverter.

According to this configuration, the cooling device can be replenished with refrigerant without any refrigerant adhering to the invertor even in the case of spillage.

In the present invention, it is preferable that the cooling device includes a radiator configured to cool cooling water, a pump configured to circulate the cooling water between the radiator and the inverter, and a cooling water tank configured to store the cooling water.

According to this configuration, the inverter can be water-cooled. Also, disposing the cooling device near the inverter enables hoses or pipes of the cooling system to be shortened.

In the present invention, it is preferable that the inverter is aligned in a vertical direction of the vehicle body of the work vehicle with a battery to which the inverter is connected.

According to this configuration, the battery is located near the inverter, and thus maintenance of the battery is easily performed together with maintenance of the inverter.

In the present invention, it is preferable that the battery is located below the inverter.

According to this configuration, the inverter covers the battery from above, and thus the inverter can be utilized as a battery cover.

In the present invention, it is preferable that the work vehicle further includes a support member extending from the transmission case to the inverter and supporting the inverter.

According to this configuration, the inverter being supported by the highly rigid transmission case via the support member enables any looseness of the inverter to be minimized.

In the present invention, it is preferable that the work vehicle further includes a driver's cabin supported by a vehicle body frame of the work vehicle via a shock absorber, and a support member extending from the driver's cabin to the inverter and supporting the inverter.

According to this configuration, the driver's cabin in which transmission of travel vibration and the like is mitigated supports the inverter via the support member, thus enabling transmission of travel vibration and the like to the inverter to be suppressed.

DETAILED DESCRIPTION OF PREFERRED EMBODIMENTS

Hereinafter, an example embodiment of the present invention will be described with reference to the drawings.

Note that, in the following description, in relation to the travel body of a tractor (example of "work vehicle"), the direction of the F arrow in FIGS. 1, 2 and the like indicates "vehicle body front", the direction of the B arrow in FIGS. 1, 2 and the like indicates "vehicle body back", the direction of the U arrow in FIGS. 1, 2 and the like indicates "vehicle body up", and the direction of the D arrow in FIGS. 1, 2 and the like indicates "vehicle body down". The direction toward the near side in FIG. 1, the direction toward the far side in FIG. 2, and the direction of the L arrow in FIGS. 5 and 6 indicate "vehicle body left", the direction toward the far side in FIG. 1, the direction toward the near side in FIG. 2, and the direction of the R arrow in FIGS. 5 and 6 indicate "vehicle body right". The left-right direction of the vehicle body is the width direction of the vehicle body.

Overall Configuration of Tractor

Figure 1:
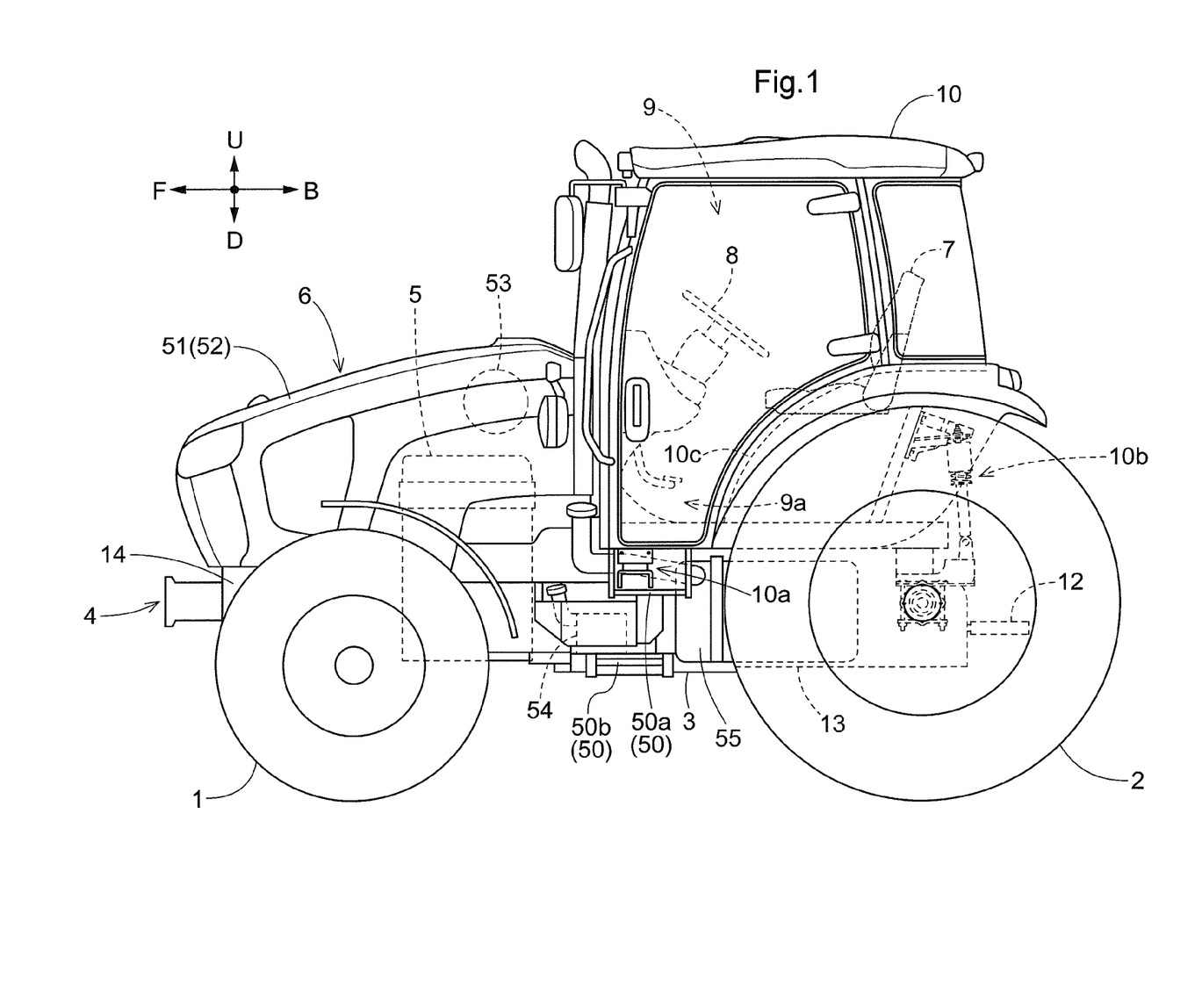
FIG. 1 is a side view showing the left side of a tractor.
Figure 2:
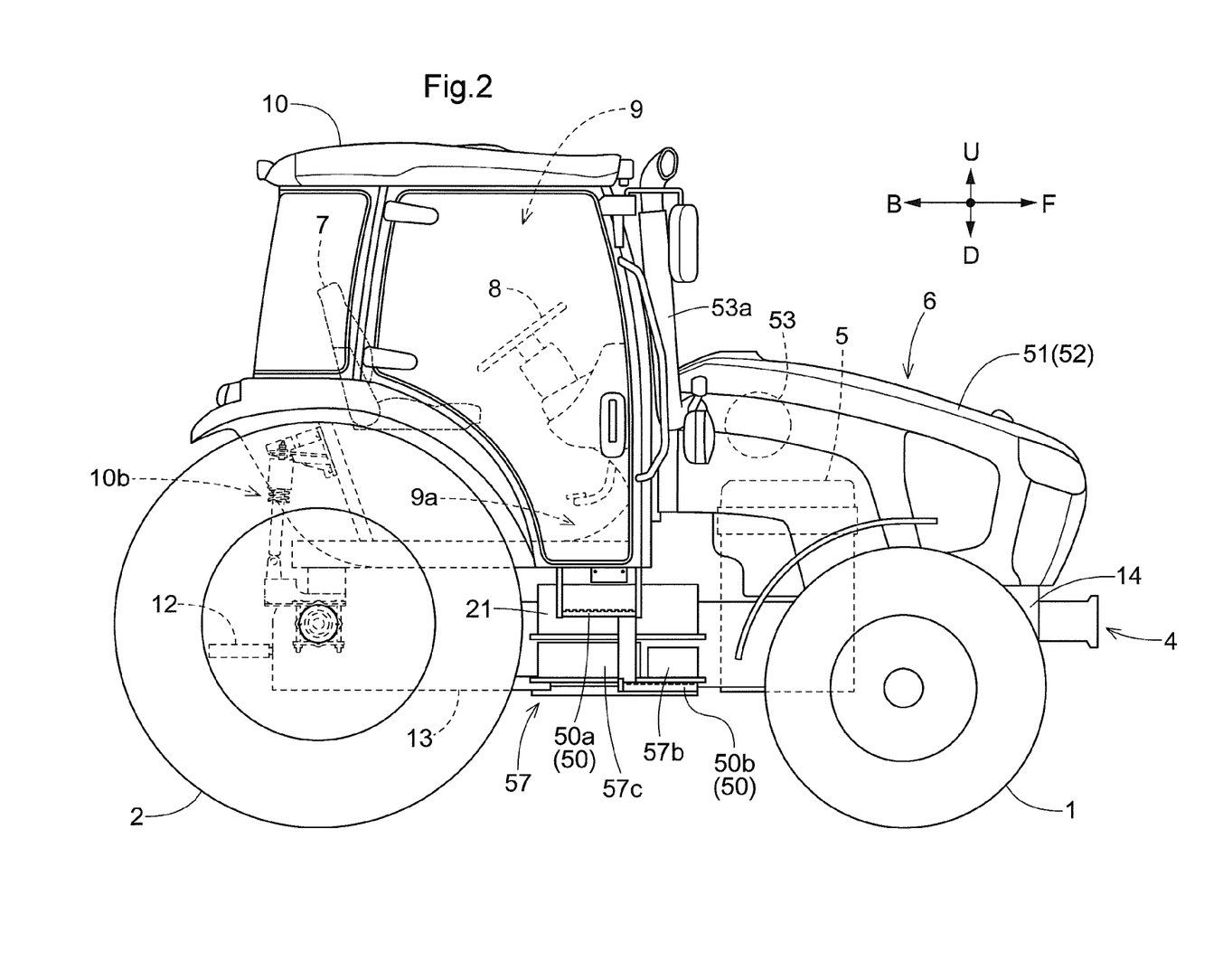
FIG. 2 is a side view showing the right side of the tractor.

As shown in FIGS. 1 and 2, the tractor includes a travel body 3 supported by a pair of left and right drivable front wheels 1 and a pair of left and right drivable rear wheels 2 serving as a rear travel device. The travel body 3 includes a vehicle body frame 4 that is constituted by an engine 5 provided in a front portion of the travel body 3, a transmission case 13 coupled at the front to a rear portion of the engine 5, and a front frame 14 coupled to a lower portion of the engine 5. In a front portion of the travel body 3 is provided a motive section 6 having the engine 5. In a rear portion of the vehicle body 3 is provided a driving section 9. In a rear portion of the transmission case 13 are provided a link mechanism (not shown) for coupling work machinery such as a rotary tiller (not shown) in such a manner as to be liftable and lowerable, and a power takeoff shaft 12 that takes power from the engine 5 and transmits power to the coupled work machinery. In the present embodiment, the rear wheels 2 are provided as a rear travel device, but a mini crawler type travel device can be employed as the rear travel device.

Driving Section

Figure 5:
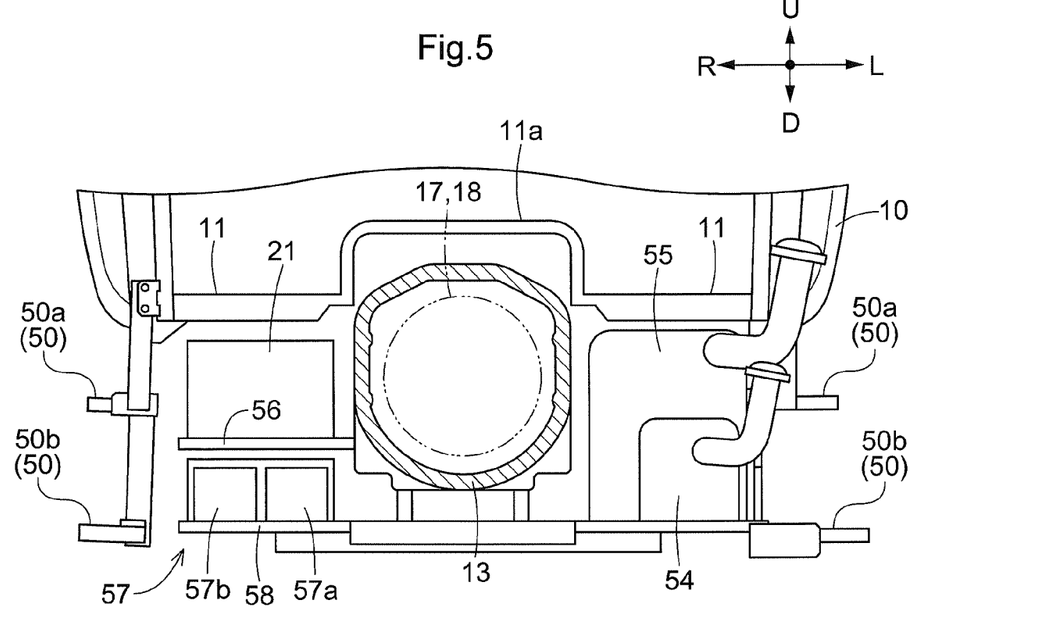
FIG. 5 is a cross-sectional view along V-V in FIG. 4.

As shown in FIGS. 1 and 2, the driving section 9 includes a driver's seat 7, an occupant floor section 11 (see FIG. 5) provided on the lower front side of the driver's seat 7, a steering wheel 8 for steering the front wheels 1, and a driver's cabin 10 covering the occupant space. The floor section 11 is supported by the driver's cabin 10. As shown in FIG. 5, in a middle portion of the floor section 11 in the width direction of the vehicle body (region located upward of the transmission case 13) is provided an upward protruding section 11a.

The driver's cabin 10 is supported by the vehicle body frame 4 via a front shock absorber 10a (see FIGS. 1, 2) and a rear shock absorber 10b (see FIGS. 1, 2) that mitigate the transmission of travel vibration and the like to the driver's cabin 10. Specifically, the driver's cabin 10 includes a lower frame 10c, and the lower frame 10c is coupled at two (left and right) places of a front portion thereof to a front portion of the transmission case 13 via the front shock absorber 10a, and at two (left and right) places of a rear portion thereof to a rear portion of the transmission case 13 via the rear shock absorber 10b.

As shown in FIGS. 1 and 2, the outer right side and outer left side of the driving section 9 are both provided with a two-step running board 50 having an upper step and a lower step used for getting in and out of the driving section 9. The two-step lower running board 50 includes an upper running board 50a that, in side view of the vehicle body, is located downward of an entrance 9a to the driving section 9, and a lower running board 50b that is positionally shifted to the front side of the vehicle body relative to the upper running board 50a.

Motive Section

As shown in FIGS. 1 and 2, the motive section 6 includes an engine compartment 52 formed by an engine bonnet 51. The engine 5 is provided in a rear portion of the engine compartment 52. Upward of a rear portion of the engine 5 is provided an exhaust gas treatment device 53 for purifying the exhaust of the engine 5. In the exhaust gas treatment device 53, purification of the exhaust gas is performed by a urea solution serving as a reducing agent being supplied from a reducing agent tank 54 (see FIGS. 1, 5) and injected into exhaust gas introduced from the engine 5 to promote hydrolysis, and exhaust gas containing a reduced amount of nitrogen oxide being obtained as a result. The purified exhaust gas is discharged from an exhaust pipe 53a connected to the exhaust gas treatment device 53.

Travel Power Transmission Device

The tractor is provided with a travel power transmission device 15 that transmits power from the engine 5 to the front wheels 1 and the rear wheels 2 and includes the transmission case 13 which is coupled at the front to a rear portion of the engine 5, as shown in FIGS. 1 and 2. The transmission case 13 is aligned with the engine 5 in the longitudinal direction of the vehicle body, and extends in the longitudinal direction of the vehicle body through a middle portion in the width direction of the vehicle body. The engine 5 and the transmission case 13 are coupled together by coupling a flywheel housing (not shown) provided in a rear portion of the engine 5 and housing a flywheel 5a (see FIG. 2) to a clutch housing (not shown) provided in a front portion of the transmission case 13.

Figure 3:
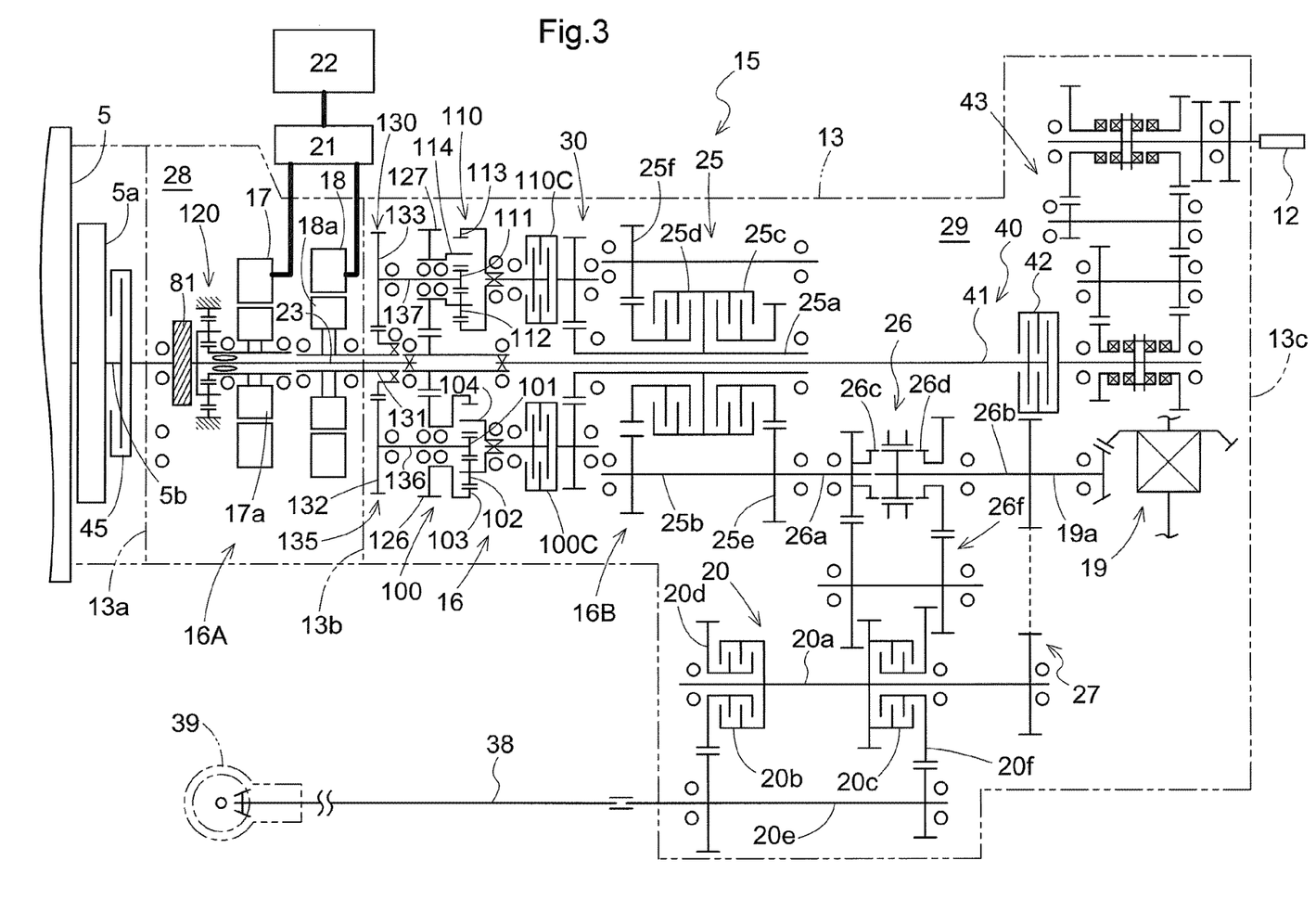
FIG. 3 is a schematic diagram of a travel power transmission device.

As shown in FIG. 3, the transmission case 13 houses a hybrid transmission 16 that shifts power from the engine 5 and outputs the resultant power to the front wheels 1 and the rear wheels 2.

Hybrid Transmission

The hybrid transmission 16, as shown in FIG. 3, includes an input shaft 23 provided in a front portion of the transmission case 13 and to which the power of the output shaft 5b of the engine 5 is input, an electric transmission section 16A rearwardly adjacent to the engine 5, and a gear transmission section 16B rearward of the electric transmission section 16A. The input shaft 23 and the output shaft 5b are located on the same axis.

As shown in FIG. 3, the electric transmission section 16A is housed in an electric transmission compartment 28 formed in a front portion of the transmission case 13. The gear transmission section 16B is housed in a gear transmission compartment 29 formed in a rear portion of the transmission case 13. The electric transmission compartment 28 is formed by a peripheral wall of the transmission case 13, a front wall 13a provided internally in a front end section of the transmission case 13, and an isolating wall 13b provided internally in an intermediate portion of the transmission case 13. The gear transmission compartment 29 is formed by the peripheral wall of the transmission case 13, a rear wall 13c located in a rear end section of the transmission case 13, and the isolating wall 13b. The electric transmission compartment 28 and the gear transmission compartment 29 are adjacent to each other across the isolating wall 13b. The electric transmission compartment 28 and the gear transmission compartment 29 are isolated from each other by the isolating wall 13b so as not to communicate.

Electric Transmission Section

As shown in FIG. 3, the electric transmission section 16A is provided between the engine 5 and the gear transmission section 16B. The electric transmission section 16A includes two motor generators 17 and 18 serving as electric motors.

The two motor generators 17 and 18 are aligned in the longitudinal direction of the vehicle body. Of the two motor generators 17 and 18, the first (front) motor generator 17 (first electric motor) is located closer to the engine 5 than the second (rear) motor generator 18 (second electric motor). The second motor generator 18 is located closer to the gear transmission section 16B than the first motor generator 17. The rotation axis of the first motor generator 17 and the rotation axis of the second motor generator 18 are located on the axis of the input shaft 23 of the transmission case 13.

Between the engine 5 and the first motor generator 17 is provided an input transmission mechanism 120. The input transmission mechanism 120 couples a rotor 17a of the first motor generator 17 to the input shaft 23 of the transmission case 13, and is configured to input the power of the input shaft 23 to the first motor generator 17. The input transmission mechanism 120 is constituted by a planetary gear mechanism, and is configured to increase the rotation speed of the input shaft 23 with the power transmitted from the engine 5 and input the resultant power to the rotor 17a of the first motor generator 17.

Gear Transmission Section

As shown in FIG. 3, the gear transmission section 16B is provided on the opposite side of the electric transmission section 16A to the engine 5. The gear transmission section 16B is rearwardly adjacent to the electric transmission section 16A.

As shown in FIG. 3, the gear transmission section 16B has a gear transmission mechanism 30. The gear transmission mechanism 30 includes a low speed planetary transmission section 100, a low speed clutch 100C, a high speed planetary transmission section 110, a high speed clutch 110C, a forward-reverse switching device 25, a sub-transmission 26, a rear wheel differential mechanism 19, a front wheel transmission 20, and a gear linkage mechanism 27.

As shown in FIG. 3, the low speed planetary transmission section 100 includes a sun gear 101, a planetary gear 102, an internal gear 103, and a carrier 104. The internal gear 103 of the low speed planetary transmission section 100 is coupled to the input shaft 23 by a first linkage mechanism 126. The high speed planetary transmission section 110 includes a sun gear 111, a planetary gear 112, an internal gear 113, and a carrier 114. The carrier 114 of the high speed planetary transmission section 110 is coupled to the input shaft 23 by a second linkage mechanism 127.

Between the gear transmission section 16B and the second motor generator 18 is provided an output transmission mechanism 130. The output transmission mechanism 130 couples the second motor generator 18 to an input section 135 located in a front portion of the gear transmission section 16B, and is configured to transmit the drive power of the second motor generator 18 to the input section 135.

Specifically, as shown in FIG. 3, the input section 135 of the gear transmission section 16B includes a first input shaft 136 coupled to the sun gear 101 of the low speed planetary transmission section 100 and a second input shaft 137 coupled to the sun gear 111 of the high speed planetary transmission section 110. The output transmission mechanism 130 includes a rotation shaft 131 coupled to a rotor 18a of the second motor generator 18, a first gear linkage mechanism 132 coupling the rotation shaft 131 to the first input shaft 136, and a second gear linkage mechanism 133 coupling the rotation shaft 131 to the second input shaft 137. In the present embodiment, the output transmission mechanism 130 of the second motor generator 18 is provided in the gear transmission compartment 29, but may be provided in the electric transmission compartment 28.

In the low speed planetary transmission section 100, the power of the input shaft 23 is transmitted to the internal gear 103 via the first linkage mechanism 126 to drive the internal gear 103, the drive power of the second motor generator 18 is transmitted to the sun gear 101 via the output transmission mechanism 130 and the first input shaft 136 to drive the sun gear 101, the power from the engine 5 and the drive power of the second motor generator 18 are combined to produce low speed combined power, and the low speed combined power is output from the carrier 104.

The low speed clutch 100C is provided between an output section of the low speed planetary transmission section 100 and an input shaft 25a of the forward-reverse switching device 25, and is configured to transmit the low speed combined power output by the low speed planetary transmission section 100 to the forward-reverse switching device 25 when switched on (on state), and to cut power transmission from the low speed planetary transmission section 100 to the forward-reverse switching device 25 when switched off (off state).

In the high speed planetary transmission section 110, the power of the input shaft 23 is transmitted to the carrier 114 via the second linkage mechanism 127 to drive the planetary gear 112, the drive power of the second motor generator 18 is transmitted to the sun gear 111 via the output transmission mechanism 130 and the second input shaft 137 to drive the sun gear 111, the engine power from the input shaft 23 and the drive power of the second motor generator 18 are combined to produce high speed combined power, and the high speed combined power is output from the internal gear 113. The high speed combined power is higher than the low speed combined power that is produced by the low speed planetary transmission section 100.

The high speed clutch 110C is provided between an output section of the high speed planetary transmission section 110 and the input shaft 25a of the forward-reverse switching device 25, and is configured to transmit the high speed combined power output by the high speed planetary transmission section 110 to the forward-reverse switching device 25 when switched on (on state), and to cut power transmission from the high speed planetary transmission section 110 to the forward-reverse switching device 25 when switched off (off state).

The forward-reverse switching device 25, as shown in FIG. 3, includes the input shaft 25a rearward of the low speed planetary transmission section 100 and the high speed planetary transmission section 110, and an output shaft 25b parallel to the input shaft 25a. The axis of the input shaft 25a is located on the axis of the input shaft 23. Provided on the input shaft 25a are a forward clutch 25c and a reverse clutch 25d. Spanning between the forward clutch 25c and the output shaft 25b is a forward gear mechanism 25e. Spanning between the reverse clutch 25d and the output shaft 25b is a reverse gear mechanism 25f.

In the forward-reverse switching device 25, the outputs of the low speed clutch 100C and the high speed clutch 110C are input to the input shaft 25a. In response to the forward clutch 25c being switched on, the power of the input shaft 25a is switched to forward power by the forward gear mechanism 25e and the forward clutch 25c, transmitted to the output shaft 25b, and output from the output shaft 25b. In response to the reverse clutch 25d being switched on, the power of the input shaft 25a is switched to reverse power by the reverse gear mechanism 25f and the reverse clutch 25d, transmitted to the output shaft 25b, and output from the output shaft 25b.

The sub-transmission 26, as shown in FIG. 3, includes an input shaft 26a coupled to the output shaft 25b of the forward-reverse switching device 25 and the output shaft 26b rearward of the input shaft 26a. The input shaft 26a and the output shaft 26b are located on the same axis. Between a rear portion of the input shaft 26a and a front portion of the output shaft 26b is provided a high speed clutch 26c. Between the input shaft 26a and a rear portion of the output shaft 26b span a low speed gear mechanism 26f and a low speed clutch 26d.

In the sub-transmission 26, the output of the forward-reverse switching device 25 is input to the input shaft 26a. In response to the high speed clutch 26c being switched on, the power of the input shaft 26a is transmitted to the output shaft 26b without being shifted via the high speed clutch 26c, and the high speed power is output from the output shaft 26b. In response to the low speed clutch 26d being switched on, the power of the input shaft 26a is shifted to low speed power by the low speed gear mechanism 26f and the low speed clutch 26d, transmitted to the output shaft 26b, and output from the output shaft 26b. The low speed power is lower than the high speed power output in response to the high speed clutch 26c being switched on.

As shown in FIG. 3, the rear wheel differential mechanism 19 includes an input shaft 19a to which the output of the sub-transmission 26 is input. The input shaft 19a is coupled to a rear portion of the output shaft 26b of the sub-transmission 26. The gear linkage mechanism 27 spans between the output shaft 26b of the sub-transmission 26 and the input shaft 20a of the front wheel transmission 20, and is configured to transmit the power of the output shaft 26b of the sub-transmission 26 to the input shaft 20a of the front wheel transmission 20.

The front wheel transmission 20, as shown in FIG. 3, includes an input shaft 20a coupled to the gear linkage mechanism 27 and an output shaft 20e parallel to the input shaft 20a. Provided on the input shaft 20a are a constant speed clutch 20b and an acceleration clutch 20c. Between the constant speed clutch 20b and the output shaft 20e spans a constant speed gear mechanism 20d. Between the acceleration clutch 20c and the output shaft 20e spans an acceleration gear mechanism 20f.

In the front wheel transmission 20, the output of the sub-transmission 26 is transmitted to the input shaft 20a by the gear linkage mechanism 27. In response to the constant speed clutch 20b being switched on, the power of the input shaft 20a is shifted to constant speed power by the constant speed clutch 20b and the constant speed gear mechanism 20d, transmitted to the output shaft 20e, and output from the output shaft 20e. The constant speed power drives the front wheels 1 at the same speed as the rear wheels 2. In response to the acceleration clutch 20c being switched on, the power of the input shaft 20a is shifted to acceleration power by the acceleration clutch 20c and the acceleration gear mechanism 20f, transmitted to the output shaft 20e, and output from the output shaft 20e. The acceleration power drives the front wheels 1 at a higher speed than the rear wheels 2. The power of the output shaft 20e of the front wheel transmission 20 is transmitted to the front wheel differential mechanism 39 via a rotation shaft 38.

In the travel power transmission device 15, when driving the front wheels 1 and the rear wheels 2, the power of the engine 5 and the drive power of the second motor generator 18 are transmitted to the front wheels 1 and the rear wheels 2.

That is, the power of the input shaft 23 is transmitted to the internal gear 103 of the low speed planetary transmission section 100 via the first linkage mechanism 126, the drive power of the second motor generator 18 is transmitted to the sun gear 101 of the low speed planetary transmission section 100 via the output transmission mechanism 130 and the first input shaft 136, the power (engine power) from the engine 5 and the drive power (motor power) of the second motor generator 18 are combined to produce low speed combined power by the low speed planetary transmission section 100, and the low speed combined power is output to the low speed clutch 100C. The power of the input shaft 23 is transmitted to the carrier 114 of the high speed planetary transmission section 110 via the second linkage mechanism 127, the drive power of the second motor generator 18 is transmitted to the sun gear 111 of the high speed planetary transmission section 110 via the output transmission mechanism 130 and the second input shaft 137, the power (engine power) from the engine 5 and the drive power (motor power) of the second motor generator 18 are combined to produce high speed combined power by the high speed planetary transmission section 110, and the high speed combined power is output to the high speed clutch 110C. In response to the low speed clutch 100C being switched on (on state) and the high speed clutch 110C being switched off (off state), the low speed combined power from the low speed clutch 100C is transmitted to the sub-transmission 26 via the forward-reverse switching device 25, and is transmitted from the sub-transmission 26 to the rear wheel differential mechanism 19 and the front wheel transmission 20.

In response to the low speed clutch 100C being switched off (off state) and the high speed clutch 110C being switched on (on state), the high speed combined power from the high speed clutch 110C is transmitted to the sub-transmission 26 via the forward-reverse switching device 25, and is transmitted from the sub-transmission 26 to the rear wheel differential mechanism 19 and the front wheel transmission 20 via the gear linkage mechanism 27.

The second motor generator 18 mainly serves as an electromotor for driving the front wheels 1 and the rear wheels 2, but serves as a generator during deceleration.

In the travel power transmission device 15, when driving the front wheels 1 and the rear wheels 2, the power from the engine 5 transmitted to the input shaft 23 is input to the first motor generator 17 by the input transmission mechanism 120, and the first motor generator 17 is driven and generates power. The generated power can be supplied for use in driving to the second motor generator 18. Power supply to the second motor generator 18 is performed by charging a battery 22 with the generated power and supplying power via the battery 22, or is performed without charging the battery 22 with the generated power and supplying power via the battery 22.

Spanning between the output shaft 5*b* and the input shaft 23 is a clutch 45, as shown in FIG. 3. The clutch 45 is configured to be switched between on (on state) and off (off state) by a hydraulic solenoid valve or the like. Due to being switched on, the clutch 45 transmits the power from the engine 5 to the electric transmission section 16A and the gear transmission section 16B, drives the front wheels 1 and the rear wheels 2 with the power of the engine 5 and the drive power of the second motor generator 18, and switches the hybrid transmission 16 to a hybrid mode in which power is generated by the first motor generator 17. Due to being switched off, the clutch 45 cuts power transmission from the engine 5 to the electric transmission section 16A and the gear transmission section 16B, and switches the hybrid transmission 16 to an electric mode in which the front wheels 1 and the rear wheels 2 are driven only by the drive power of the second motor generator 18. A dry clutch can be employed as the clutch 45.

As shown in FIG. 3, provided on the input shaft 23 are a trochoid pump 81 that supplies lubricating oil to the first motor generator 17, the second motor generator 18, and the gear transmission mechanism 30.

Work Power Transmission Device

As shown in FIGS. 1 and 2, the power takeoff shaft 12 is supported by a rear portion of the transmission case 13. As shown in FIG. 3, a work power transmission device 40 that transmits the power of the engine 5 to the power takeoff shaft 12 is housed in the transmission case 13.

The work power transmission device 40, as shown in FIG. 3, includes a rotation shaft 41 that extends rearward of the input shaft 23 in the longitudinal direction of the vehicle body and is coupled at the front to the input shaft 23, a work clutch 42 that is coupled to a rear portion of the rotation shaft 41, and a power takeoff shaft transmission 43 that shifts the output of the work clutch 42 and transmits the resultant output to the power takeoff shaft 12. The rotation shaft 41 and the input shaft 23 are located on the same axis. The input shaft 23 and the rotation shaft 41 are linked directly or via a joint.

In the work power transmission device 40, the power of the input shaft 23 is transmitted to the rotation shaft 41, and is transmitted from the rotation shaft 41 to the power takeoff shaft 12 via the work clutch 42 and the power takeoff shaft transmission 43. The work clutch 42 is switched between an on state in which power from the engine 5 is transmitted to the power takeoff shaft 12 and an off state in which power transmission from the engine 5 to the power takeoff shaft 12 is cut.

Motor Generators, Inverter

As shown in FIG. 3, the first motor generator 17 and the second motor generator 18 are connected to an inverter 21, and the inverter 21 is connected to the battery 22. The inverter 21 converts the AC power from the first motor generator 17 into DC power and supplies the DC power to the battery 22, and converts the DC power from the battery 22 into AC power and supplies the AC power to the second motor generator 18.

Figure 4:
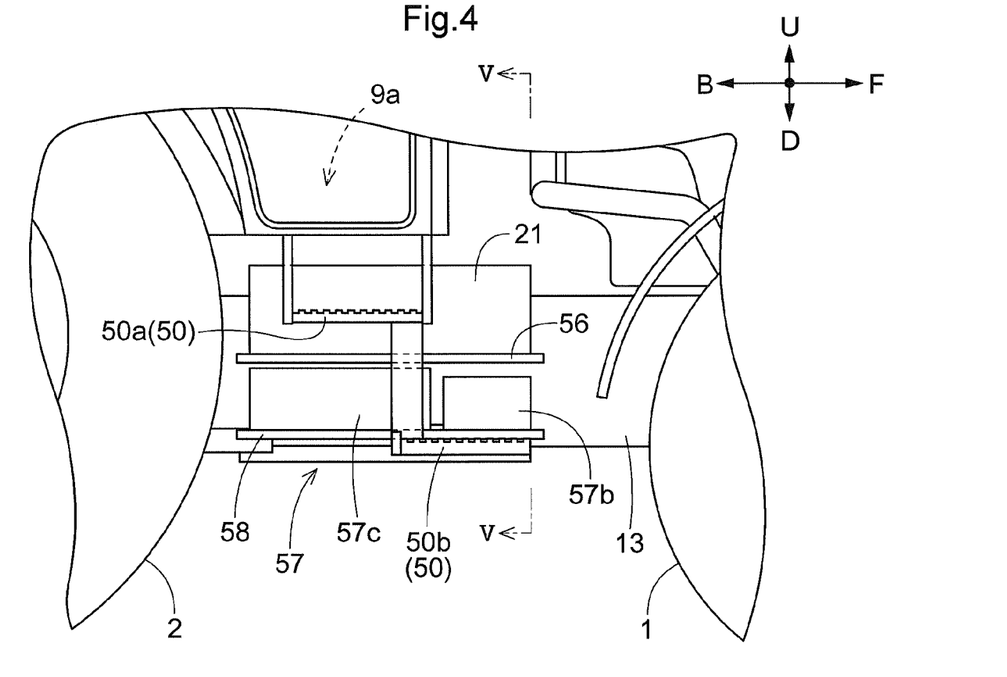
FIG. 4 is a side view showing an inverter and a cooling device.

As shown in FIGS. 2, 4 and 5, the inverter 21 is provided between the front wheels 1 and the rear wheels 2, on one side (first side) in the width direction of the vehicle body relative to the transmission case 13, and under the floor section 11. Maintenance of the inverter 21 can be performed via the region between the front wheels 1 and the rear wheels 2 from laterally outward of the travel body 3.

As shown in FIGS. 1 and 5, the reducing agent tank 54 for storing a urea solution serving as a reducing agent to be supplied to the exhaust gas treatment device 53 is provided between the front wheels 1 and the rear wheels 2 and on the other side (second side) in the width direction of the vehicle body relative to the transmission case 13, under the floor section 11. The reducing agent tank 54 is provided on the opposite side of the transmission case 13 to the inverter 21. As shown in FIGS. 1 and 5, on the same side of the transmission case 13 as the reducing agent tank 54 is provided a fuel tank 55 for the engine. The weight of the inverter 21 and the weight of both the urea solution stored in the reducing agent tank 54 and the fuel stored in the fuel tank 55 are imposed on the vehicle body so as to be distributed laterally between both sides of the vehicle body relative to the transmission case 13.

In the present embodiment, the inverter 21 is provided on the right side of the vehicle body relative to the transmission case 13 and the reducing agent tank 54 and the fuel tank 55 are provided on the left side of the vehicle body relative to the transmission case 13. The present invention is not limited thereto, and the inverter 21 may be provided on the left side of the vehicle body relative to the transmission case 13, and the reducing agent tank 54 and the fuel tank 55 may be provided on the right side of the vehicle body relative to the transmission case 13.

As shown in FIG. 5, the inverter 21 is supported by a support member 56 extending from the transmission case 13 to the inverter 21. The inverter 21 is supported by the highly rigid transmission case 13 via the support member 56.

As shown in FIGS. 2, 4 and 5, the inverter 21 is located inward of the upper running board 50*a* in the width direction of the vehicle body. The inverter 21 is laterally protected from the outside by the upper running board 50*a*.

The inverter 21 and a cooling device 57 that cools the inverter 21 are aligned in the vertical direction of the vehicle body. In the present embodiment, as shown in FIGS. 2, 4 and 5, the cooling device 57 is located downward of the inverter 21, but the cooling device 57 may be located upward of the inverter 21. As shown in FIG. 5, the cooling device 57 is supported by a support member 58 extending from the cooling device 57 to a lower portion of the transmission case 13, and the cooling device 57 is supported by the transmission case 13 via the support member 58.

The cooling device 57, as shown in FIGS. 4 and 5, has a radiator 57*a* for cooling the cooling water, a pump 57*b* for circulating the cooling water between the radiator 57*a* and a cooling section provided in the inverter 21, and a cooling water tank 57*c* for storing the cooling water. In the present embodiment, an electric pump is employed as the pump 57*b*. The cooling water tank 57*c* and the pump 57*b* are aligned in the longitudinal direction of the vehicle body. The pump 57*b* and the radiator 57*a* are aligned in the width direction of the vehicle body. The radiator 57*a* is located inward of the pump 57*b* in the width direction of the vehicle body.

Figure 6:
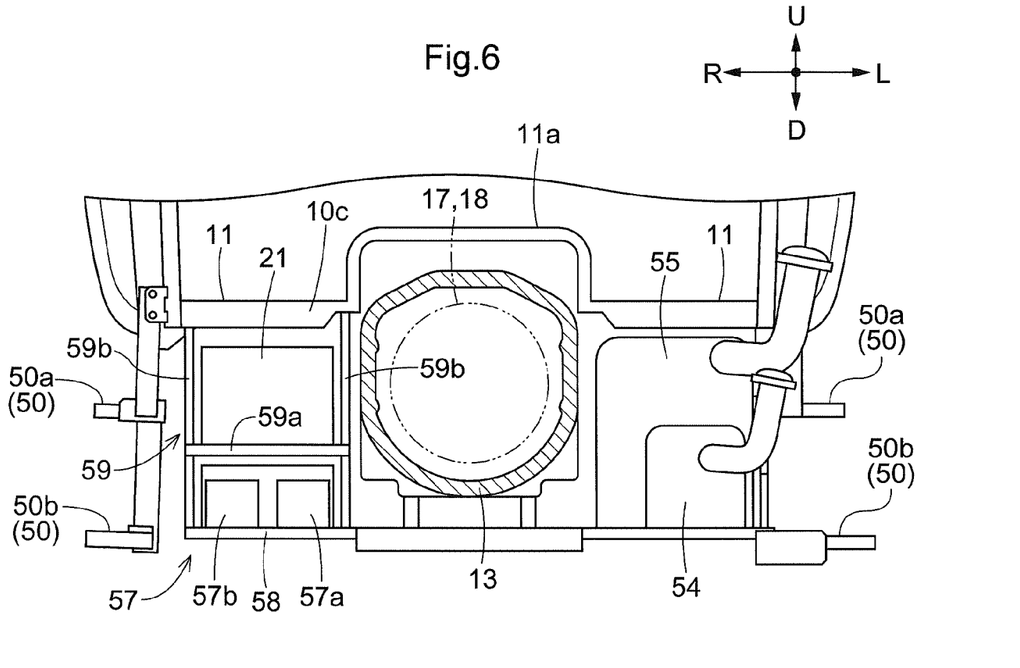
FIG. 6 is a front view showing installation of the inverter according to another embodiment.

Other Embodiments (1) FIG. 6 is a side view showing an installation structure of the inverter 21 according to another embodiment. In the installation structure of the inverter 21 according to this other embodiment, as shown in FIG. 6, the inverter 21 is supported by a support member 59 extending from the inverter 21 to the lower frame 10c of the driver's cabin 10, and the inverter 21 is supported by the driver's cabin 10 via the support member 59. The support member 59 includes a support base 59a on which the inverter 21 is placed, and a support arm 59b that extends toward the support table 59a from the lower frame 10c and supports the support base 59a in a suspended manner. Vibration transmitted from the vehicle body frame 4 to the inverter 21 is mitigated by the front shock absorber 10a and the rear shock absorber 10b.

Figure 7:
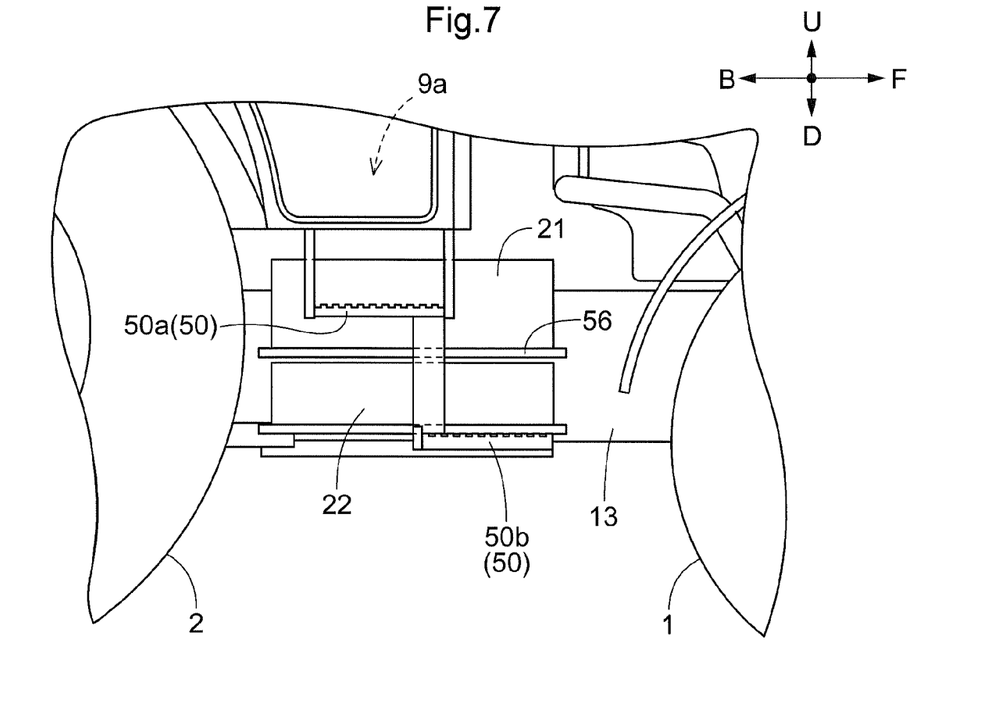
FIG. 7 is a side view showing installation of the inverter according to another embodiment.

(2) FIG. 7 is a side view showing an installation structure of the inverter 21 according to another embodiment. In the installation structure of the inverter 21 according to this other embodiment, the inverter 21 and the battery 22 are aligned in the vertical direction of the vehicle body. In the present embodiment, the battery 22 is provided below the inverter 21, but it is possible to provide the battery 22 above the inverter 21.

(3) In the above-described embodiment, the hybrid transmission 16 is provided, but the present invention is not limited thereto, and an engine may be omitted and a transmission that transmits only the drive power of an electric motor to the rear wheels 2 may be provided.

(4) In the above-described embodiment, the drive power is transmitted to both the front wheels 1 and the rear wheels 2, but the drive power may be transmitted to only the rear wheels 2 and not to the front wheels 1.

(5) In the above-described embodiment, the first motor generator 17 and the second motor generator 18 are aligned in the longitudinal direction of the vehicle body, but the present invention is not limited thereto, and the first motor generator 17 and the second motor generator 18 may be aligned in the width direction or the vertical direction of the vehicle body.

(6) In the above-described embodiment, the running board 50a serves as a guard member for the inverter 21, but the running board may not be located laterally outward of the inverter 21.

(7) In the above-described embodiment, the inverter 21 and the cooling device 57 are aligned in the vertical direction, but the inverter 21 and the cooling device 57 may not be aligned in the vertical direction.

(8) In the above-described embodiment, the inverter 21 and the battery 22 are aligned in the vertical direction, but the inverter 21 and the battery 22 may not be aligned in the vertical direction.

(9) In the above-described embodiment, the driver's cabin 10 is provided, but the driver's cabin 10 may not be provided.

(10) The present invention can be applied to work vehicles having a transmission that transmits the drive power of an electric motor to a rear travel device.

What is claimed is:

1. A work vehicle, comprising:
a front wheel;
a rear travel device;
a travel body supported by the front wheel and the rear travel device;
a driving section provided in the travel body and having an occupant floor section;
a transmission configured to output power to the rear travel device;
a transmission case housing the transmission;
an electric motor coupled to the transmission; and
an inverter connected to the electric motor, wherein:
the inverter is provided between the front wheel and the rear travel device, under the floor section, and laterally of the transmission case, and
the inverter laterally overlaps at least one portion of a side of the transmission case.

2. The work vehicle according to claim 1, further comprising:
a running board provided laterally outward of the driving section, wherein:
the inverter is provided inward of the running board in a width direction of a vehicle body of the work vehicle.

3. The work vehicle according to claim 1, further comprising:
a cooling device configured to cool the inverter, wherein:
the cooling device laterally overlaps at least one other portion of the side of the transmission case, and
the inverter and the cooling device are aligned to at least partially overlap each other in a direction that is vertical with respect to a vehicle body of the work vehicle.

4. The work vehicle according to claim 3, wherein:
the cooling device is located under the inverter.

5. The work vehicle according to claim 3, wherein:
the cooling device includes:
a radiator configured to cool cooling water;
a pump configured to circulate the cooling water between the radiator and the inverter; and
a cooling water tank configured to store the cooling water.

6. The work vehicle according to claim 1, wherein:
the inverter is aligned in a vertical direction of a vehicle body of the work vehicle with a battery to which the inverter is connected.

7. The work vehicle according to claim 6, wherein:
the battery is located below the inverter.

8. The work vehicle according to claim 1, further comprising:
a support member extending from the transmission case to the inverter and supporting the inverter.

9. The work vehicle according to claim 1, further comprising:
a driver's cabin supported by a vehicle body frame of the work vehicle via a shock absorber; and
a support member extending from the driver's cabin to the inverter and supporting the inverter.

10. A work vehicle comprising:
a front wheel;
a rear travel device;
a travel body supported by the front wheel and the rear travel device;
a driving section provided in the travel body and having an occupant floor section;
a hybrid transmission having an engine and a motor generator, and configured to shift drive power of the engine and output resultant drive power to the rear travel device;
a transmission case housing the hybrid transmission;
an exhaust gas treatment device configured to purify an exhaust of the engine;
a reducing agent tank configured to store a reducing agent to be supplied to the exhaust gas treatment device; and
an inverter connected to the motor generator, wherein:
the inverter is provided between the front wheel and the rear travel device, under the floor section, and on a first side in a width direction of a vehicle body of the work vehicle relative to the transmission case, and the reducing agent tank is provided between the front wheel and the rear travel device, under the floor section, and on a second side in the width direction of the vehicle body relative to the transmission case.

11. The work vehicle according to claim 10, further comprising:
a running board provided laterally outward of the driving section, wherein:
the inverter is provided inward of the running board in the width direction of the vehicle body.

12. The work vehicle according to claim 10, further comprising:
a cooling device aligned with the inverter in a vertical direction of the vehicle body and configured to cool the inverter.

13. The work vehicle according to claim 12, wherein:
the cooling device is located under the inverter.

14. The work vehicle according to claim 12, wherein:
the cooling device includes:
a radiator configured to cool cooling water;
a pump configured to circulate the cooling water between the radiator and the inverter; and
a cooling water tank configured to store the cooling water.

15. The work vehicle according to claim 10, wherein:
the inverter is aligned in a vertical direction of the vehicle body with a battery to which the inverter is connected.

16. The work vehicle according to claim 15, wherein:
the battery is located below the inverter.

17. The work vehicle according to claim 10, further comprising:
a support member extending from the transmission case to the inverter and supporting the inverter.

18. The work vehicle according to claim 10, further comprising:
a driver's cabin supported by a vehicle body frame of the work vehicle via a shock absorber; and
a support member extending from the driver's cabin to the inverter and supporting the inverter.

19. A work vehicle, comprising:
a front wheel;
a rear travel device;
a travel body supported by the front wheel and the rear travel device;
a driving section provided in the travel body and having an occupant floor section;
a transmission configured to output power to the rear travel device;
a transmission case housing the transmission;
an electric motor coupled to the transmission;
an inverter connected to the electric motor, wherein the inverter is provided between the front wheel and the rear travel device, under the floor section, and laterally of the transmission case; and
a cooling device aligned with the inverter in a vertical direction of a vehicle body of the work vehicle and configured to cool the inverter, wherein the cooling device includes:
a radiator configured to cool cooling water;
a pump configured to circulate the cooling water between the radiator and the inverter; and
a cooling water tank configured to store the cooling water.

20. The work vehicle according to claim 19, further comprising:
a running board provided laterally outward of the driving section, and
wherein the inverter is provided inward of the running board in a width direction of a vehicle body of the work vehicle.

* * * * *